United States Patent Office 3,506,224
Patented Apr. 14, 1970

3,506,224
SUPPORTING STRUCTURE FOR A
SELF-SEALING FUEL TANK
George B. Harr, Pasadena, and Virgil J. Mattson, Inglewood, Calif., assignors to The Firestone Tire & Rubber Company, Akron, Ohio, a corporation of Ohio
Continuation of application Ser. No. 661,721, Aug. 18, 1967, which is a continuation of application Ser. No. 416,096, Dec. 4, 1964. This application Dec. 4, 1968, Ser. No. 785,853
Int. Cl. B64d 37/02; B65d 25/14
U.S. Cl. 244—135
2 Claims

ABSTRACT OF THE DISCLOSURE

A fuel tank in the wing of an airplane may be supported on stringers with foam in between them or there may be a sheet material on the stringers with the tank supported above it on foam.

---

Figure 1:
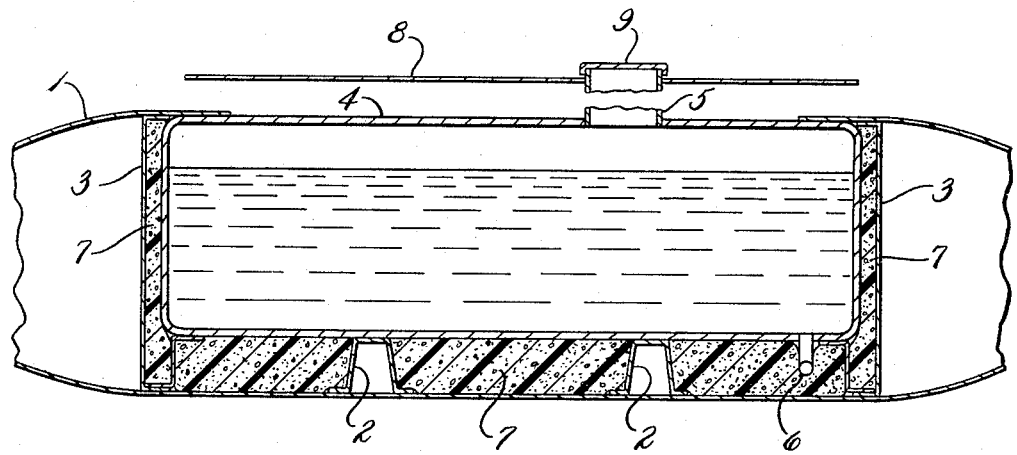

This application is a continuation of our application Ser. No. 661,721 filed Aug. 18, 1967, which is a continuation of our application Ser. No. 416,096 filed Dec. 4, 1964 (both abandoned).

This invention relates to a flexible foam support system for self-sealing military fuel tanks.

The functioning of self-sealing-type fuel tanks is dependent upon several factors. These include adequate support for the exterior of the fuel tank, the realignment of the lips of any wounds in the walls of the tank produced by a projectile and the efficiency of the sealant material. For a number of years and to the present, the support of the fuel tank and the assistance in alignment of the lips of the wound have been achieved by the use of so-called "liner board." This liner board is installed in the fuel tank cavity over the top of reinforcing members such as stringers, ribs, webs, etc. The liner board usually consists of multiple plies of glass or nylon cloth impregnated with various plastic materials and usually press-cured to form a strong laminar thin board material. Such liners or backing boards have a tendency to shatter during the passage of various size projectiles. Also such liner materials are inherently expensive and are costly and difficult to install.

This invention pertains to a new means for accomplishing support and lip alignment for self-sealing fuel tanks. This invention involves the use of cellular-type plastic foams of a medium to fairly high density, but of a flexible, resilient nature to accomplish the support of the self-sealing tank. The modulus of compression of the foam should be such as to counteract the pressure created by the effective head of fuel.

An additional benefit of this invention is fire prevention as derived by the preclusion of large air spaces surrounding the self-sealing fuel tanks. The foam is fuel resistant and is preferably compounded to be fire resistant. A polyurethane foam is quite satisfactory. The foam material greatly facilitates installation and may either be free or may be affixed on to the cavity or may be affixed on to the tank.

Fuel tanks are located in a variety of vehicles as, for example, airplanes, helicopters, armored cars, tanks, etc. It will be described more particularly in connection with an installation in an aircraft. Often the lower skin of the wing of aircraft forms the floor of the cavity. In the fuselage the cavity floor may or may not be the fuselage skin, or it may or may not be some other structural member. The sides of the cavity in either the wing or the fuselage may consist of a web such as a stressed spar web. Also, the cavity may include a secondary stressed skin wherein this skin is attached to the tops of the reinforcing members.

The invention relates to fuel-tank installations in such cavities and provides a resilient, flexible, cellular support of medium to fairly high density foam between the floor of the cavity and the bottom of the tank. The tank may rest on stringers or other stiffening members, in which case the cellular support is located between the stiffening members. In those cases where the tank rests against spar webs, the cellular support may be inserted between the web and the tank wall. In those instances where the secondary stress skin is employed, the cellular support may be located between the secondary skin and the self-sealing tank wall. Also, the foam may be located between the outer skin and the secondary skin to minimize explosion-forming cavities.

Whether limited to occupying spaces between structural members, or forming a continuous support under the entire bottom of the tank, or both, the foam spaces the tank from the floor of the cavity, and usually also from the sides of such a cavity, and if a projectile pierces the metal floor or a wall of the cavity and petals the metal inward, the foam will support the tank away from such petals so that after the projectile has pierced the wall of the tank the lips that are formed from the wall will spring back into alignment so that the tank will seal itself.

If the tank rests on a metallic bottom or on a skin or backing or lining or any other rigid member, the petaling of this member by the projectile will interfere with the tank sealing itself after the passage of the projectile. On the other hand, when a projectile passes through the foam, the foam does not shatter or chunk badly, but rather due to its resilience it springs back to its original shape and location thereby helping to realign and support the lips of the wound in the fuel tank.

The foam support of this invention may be produced in situ, or it may be manufactured in slab or other form to the thickness and size necessary to form the proper support. It may be covered with a flexible coating, but this is not essential.

Figure 2:
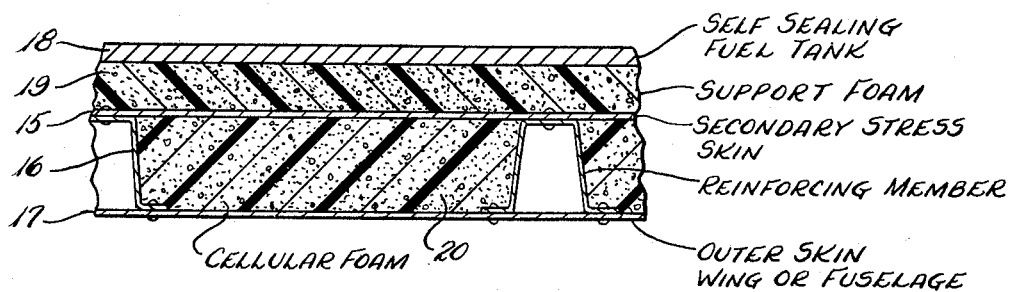

The invention is further described in connection with the drawings, in which:

FIGURE 1 is a section through a tank located in an airplane wing as herein disclosed; and FIGURE 2 is an enlarged detail of modified supporting means for such a tank.

FIGURE 1 portrays a typical section through the wing of a light airplane. The structure portrayed is quite similar to that to be expected in the fuselage of similar aircraft. In the instance of heavier or larger aircraft, the structure portrayed in FIGURE 1 is merely of a larger and more heavily reinforced nature.

Wing skins 1 form the exterior of the structure and define the upper and lower limits of the fuel tank cavity. The wing skin 1 is reinforced by stiffener members 2 which may be in the form of U-sections or Z-sections, etc. The cavity is further delineated by spar webs 3. Flexible self-sealing fuel tank 4 is of a size to properly fit into the cavity. The fuel tank 4 is provided with a typical filler opening 5 and in the instance of larger installations a multitude of other special-purpose-type fittings, such as vent fittings, gauge fittings, etc. Furthermore, the fuel tank is provided with a drainage system 6.

To accomplish the necessary support of the bottom and sides of the installed self-sealing fuel tank, resilient, flexible, cellular foam material 7 is installed between stiffener sections 2. Foam is shown as inserted between spar web 3 and the sides of the fuel tank. The thickness of the cellular support material 7 is determined by the height of the stiffener members, the desired void between the tank and the spar web, etc. The modulus of compression or hardness of the flexible foam is tailored according to the pressure exerted on it by the effective weight of the fuel in the filled tank, etc. The entire assembly is closed by skin member 8 which is portrayed in the open position. It is equipped with filler fitting 9 which mates with the tank opening 5 and when in place is held to the balance of the skin by suitable releasable fastening means.

FIGURE 2 portrays a situation wherein additional structural strength and rigidity is achieved by employing a secondary stress skin 15 which is attached to the top of reinforcing stiffening members 16, which, in turn, are fastened to the outer wing or fuselage skin 17.

In those instances where self-sealing fuel tanks 18 are used in this construction, it is preferable to employ a supporting foam 19 to prevent the projectile-petaling of the secondary stress skin 15 holding the wound in the self-sealing tank wall open.

In those instances where it is desired to minimize explosion hazard from being created in cavities, it is desirable to introduce cellular foam 20 in the cavity between the outer skin 17 and the secondary skin 15, this of course being true if it is convenient and possible to do so.

We claim:

1. An airplane provided with a cavity having spaced support members therein, a self-sealing fuel tank in the cavity above said spaced support members, a sheet member between the tank and the spaced support members which sheet member is fastened to said spaced support members, flexible resilient foam between (a) the spaced support members, (b) said sheet member and (c) the bottom of the cavity, and other flexible resilient foam between said sheet member and tank.

2. An airplane having a cavity in the wing, spaced support members on the bottom of the cavity, a fuel tank resting on the support members, and flexible resilient foam located on the bottom of the cavity between such support members and in pressure contact with the bottom of the tank.

References Cited

UNITED STATES PATENTS

| | | |
|---|---|---|
| 2,425,514 | 8/1947 | Dasher et al. |
| 2,714,516 | 8/1955 | Brown. |
| 3,181,311 | 5/1965 | Latzer. |
| 3,286,825 | 11/1966 | Laas. |
| 3,416,692 | 12/1968 | Cline. |

RAPHAEL H. SCHWARTZ, Primary Examiner

U.S. Cl. X.R.

220—9, 63